United States Patent [19]

Erickson et al.

[11] Patent Number: 5,054,344
[45] Date of Patent: Oct. 8, 1991

[54] QUICK CHANGE CLAMPING MECHANISM

[75] Inventors: Robert A. Erickson, Raleigh, N.C.; Ted R. Massa, Latrobe, Pa.

[73] Assignee: Kennametal Inc., Latrobe, Pa.

[21] Appl. No.: 473,289

[22] Filed: Feb. 1, 1990

[51] Int. Cl.$^5$ ............................................. B23B 29/00
[52] U.S. Cl. ..................................... 82/160; 409/233; 408/239 A; 279/75
[58] Field of Search .................. 82/160, 158; 407/101, 407/46; 408/239 A, 239 R; 279/75; 409/232–234; 403/322

[56] References Cited

U.S. PATENT DOCUMENTS

| | | | |
|---|---|---|---|
| 4,135,418 | 1/1979 | McCray et al. | 279/75 |
| 4,615,244 | 10/1986 | Reiter et al. | 82/160 |
| 4,710,077 | 12/1987 | Ramunas | 409/232 |
| 4,723,877 | 2/1988 | Erickson | 82/160 |
| 4,740,122 | 4/1988 | Glaser | 409/232 |
| 4,747,735 | 5/1988 | Erickson et al. | 409/234 |
| 4,932,295 | 6/1990 | Erickson | 82/160 |

Primary Examiner—Larry I. Schwartz
Assistant Examiner—Kevin J. Carroll
Attorney, Agent, or Firm—Thomas R. Trempus

[57] ABSTRACT

A clamping assembly for releasably holding a tool holder having a shank includes a tool support member having a bore extending along a longitudinal axis. A locking mechanism is disposed in the axial bore for securing the tool holder to the support member. The locking mechanism includes a lock rod having first and second contact surfaces mounted in the support member. The lock rod moves along the longitudinal axis between a locked position and a release position. A wedge rod is mounted in the support member for reciprocal movement along an axis angularly disposed with respect to the longitudinal axis. The wedge rod has first and second wedge surfaces which incline in parallel fashion from opposite edges of the wedge rod. First and second force transmitting elements are interposed between the wedge surfaces of the wedge body and the contact surfaces of the lock rod. When the lock rod is moved in first direction, the first force transmitting element is moved outward with respect to the transverse axis into contact with the first support surface and pushes the lock rod towards a locked position. When the wedge rod is moved in a second direction, the second force transmitting element is moved outward with respect to the transverse axis into engagement with the second contact surface of the lock rod and moves the lock rod towards a release position.

42 Claims, 10 Drawing Sheets

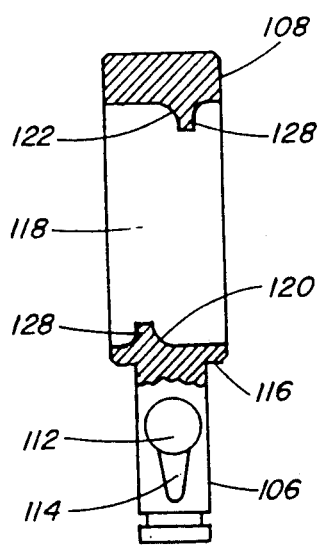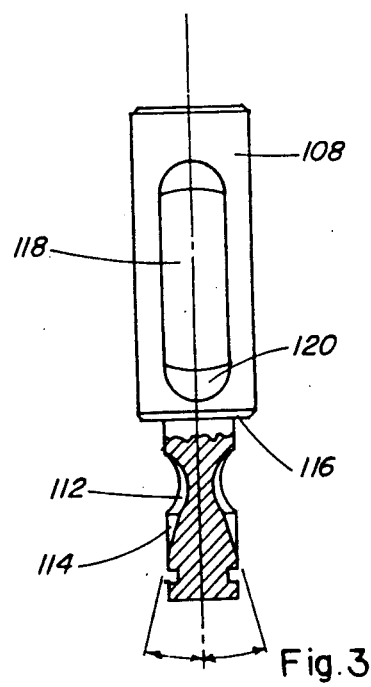

QUICK CHANGE CLAMPING MECHANISM

BACKGROUND OF THE INVENTION

The present invention relates to mechanisms for releasably clamping a tool holder to a support member. It is especially concerned with clamping mechanisms for clamping tool holders having hollow, tubular shanks. In this type of clamping mechanism, ball-like locking elements are commonly used to engage and hold the shank of the tool holder. One variation of this type of clamping mechanism employs an elongated lock rod which is reciprocally mounted in the support member. The lock rod generally includes two ramps so that when it is moved in a first direction, the ramps urge the locking elements radially outwardly to engage and hold the shank. Concave depressions adjacent the ramps permit the locking elements to move radially inward when the lock rod is moved in a second direction thus releasing the shank and permitting removal of the tool holder. Typically, the input force is applied along the axis of the lock rod. In some circumstances, on the other hand, the input force must be applied at an angle (usually 90°) with respect to the axis of the lock rod. One such clamping mechanism is shown in U.S. Pat. No. 4,615,244 to Reiter, et al. The Reiter device includes a lock rod having a central passage extending therethrough. The inner walls of the central passage are formed with two opposing wedge faces. First and second cams, having cam faces adapted to engage the wedge faces on the lock rod, are moveable in a direction perpendicular to the axis of the lock rod. A screw type mechanism is provided for moving the cams towards or away from each other to effect longitudinal displacement of the lock rod.

A disadvantage associated with previous 90° mechanisms employing a conventional wedge is that the sliding contact between wedge surfaces results in large frictional losses. Due to the frictional losses, the ratio of output force to input force is lowered thereby raising the torque or spring force needed to clamp the tool holder.

Another disadvantage with prior art devices is that the wedge angles are fixed. Sometimes it is necessary to change the wedge angle. For instance, if one wanted to reduce stroke, a steeper angle would be required. If one wanted to increase mechanical advantage, a shallower angle would be needed. In prior art devices, if the wedge angle on one component is changed, a corresponding change must be made in each of its mating components. Since a single component can not be changed without changing mating components, a greater number of parts must be maintained in inventory.

A further disadvantage of prior art designs relates to ease of manufacture. Prior art mechanisms which employ a conventional wedge present numerous manufacturing problems such as multiple setups and surface finishing. These manufacturing problems ultimately result in numerous inefficiencies and higher costs.

SUMMARY OF THE INVENTION

The invention relates to a quick change clamping mechanism for securing a tool holder having a hollow, tubular shank. More particularly, the invention provides a new clamping arrangement in which the input force is applied in a direction different from the output force.

The clamping mechanism includes a locking means for engaging and holding the shank of the tool holder. The locking means includes a lock rod movably mounted in the support member for reciprocal movement along a longitudinal axis between a locked position and a release position.

Displacement of the lock rod along the longitudinal axis is accomplished by means of a wedge rod. The wedge rod is mounted in the support block for reciprocal movement along a transverse axis. The wedge rod includes two angled wedging surfaces. Preferably, the wedging surfaces are concave cylindrical ball grooves. The wedging surfaces incline in parallel fashion from opposite edges of the wedge rod.

The wedge rod extends through a transverse passage in the lock rod, the inner walls of which are formed with two contact surfaces. A pair of ball-like force transmitting elements are interposed between the wedge rod and the lock rod. Each force transmitting element is engaged with a respective wedge surface on the wedge rod and contact surface on the lock rod. Thus, when the wedge rod is moved in a first direction, a first force transmitting element will be urged outwardly along the first wedge surface. The force transmitting element, in turn, pushes against the corresponding contact surface on the lock rod to urge the lock rod rearwardly to a locked position. When the wedge rod is moved in a second direction, the first force transmitting element moves inwardly along towards the transverse axis. The second force transmitting element moves outwardly along its wedge surface and pushes against the second contact surface on the lock rod to move the lock rod forwardly towards a release position.

Accordingly, it is a object of the present invention to provide a clamping mechanism wherein the input force is applied in the direction different than the final output force.

Another object of the present invention is to provide a more efficient clamping mechanism which has lower frictional losses than prior devices and thus requires less torque or spring force to clamp the tool holder.

Another object of the present invention is to provide a clamping mechanism in which the components thereof will have a longer useful life.

Another object of the present invention is to provide a clamping mechanism incorporating a lock rod and a wedge rod, wherein the wedge rod can be replaced without necessitating replacement the lock rod.

Another object of the present invention is to provide a clamping mechanism wherein the individual components thereof are simpler in construction and easier to manufacture.

Other objects and advantages of the present invention will become apparent and obvious from a study of the following description and the accompanying drawings which are merely illustrative of such invention.

BRIEF DESCRIPTION OF THE DRAWINGS

FIG. 1B is a portion of an exploded perspective of the clamping assembly, the remaining portion being shown in FIG. 1a.

FIG. 3 is a side elevational view of the lock rod, a portion of which is shown in section to illustrate the concave depressions and ball ramps.

FIG. 4 is a front elevational view of the lock rod, a portion of which is shown in section to illustrate the central passage and contact surfaces.

DETAILED DESCRIPTION OF THE INVENTION

Figure 1A:
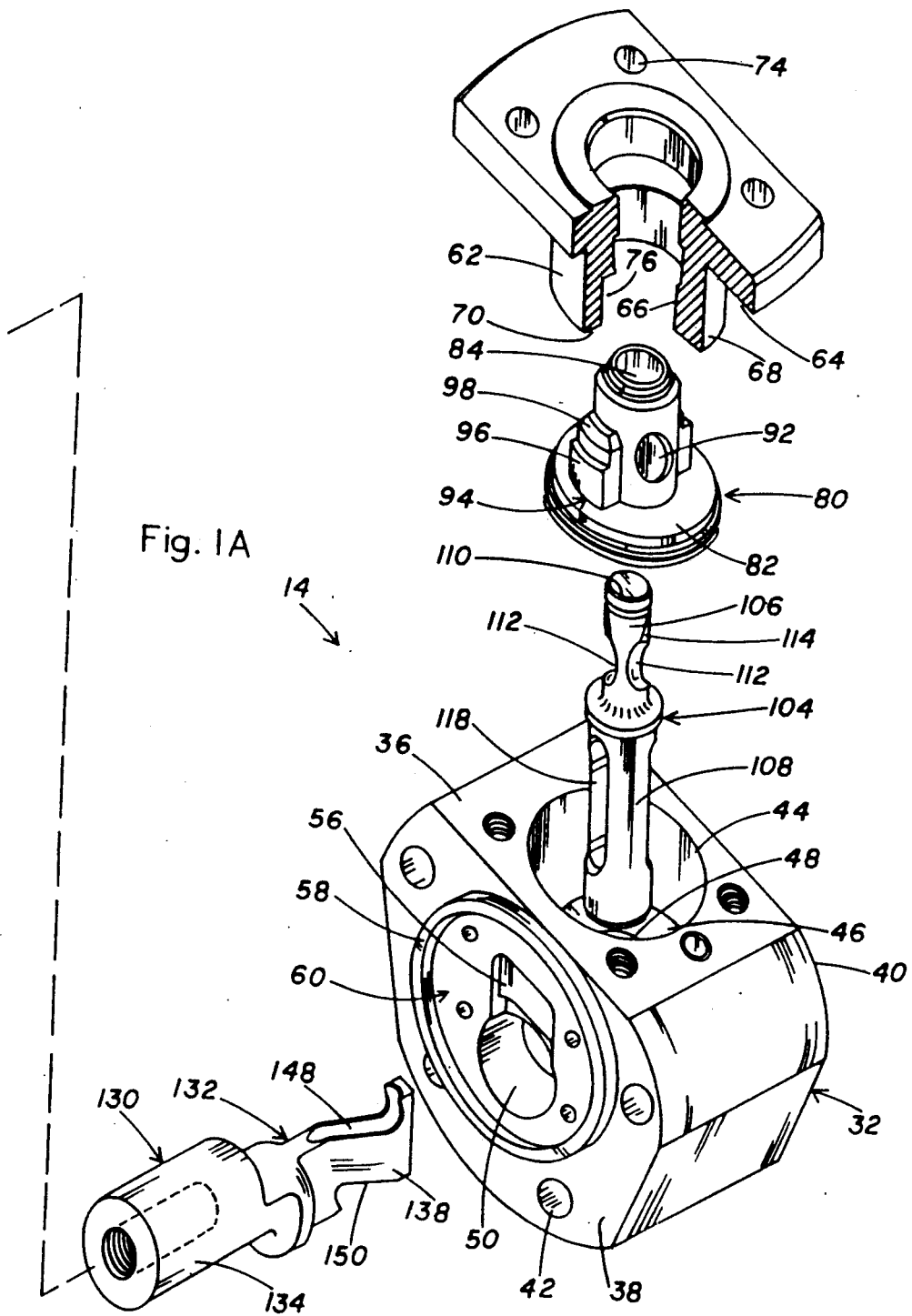
FIG. 1A comprises a portion of an exploded perspective view of the clamping mechanism of the present invention, the remaining portion being shown in FIG. 1b.
Figure 1B:
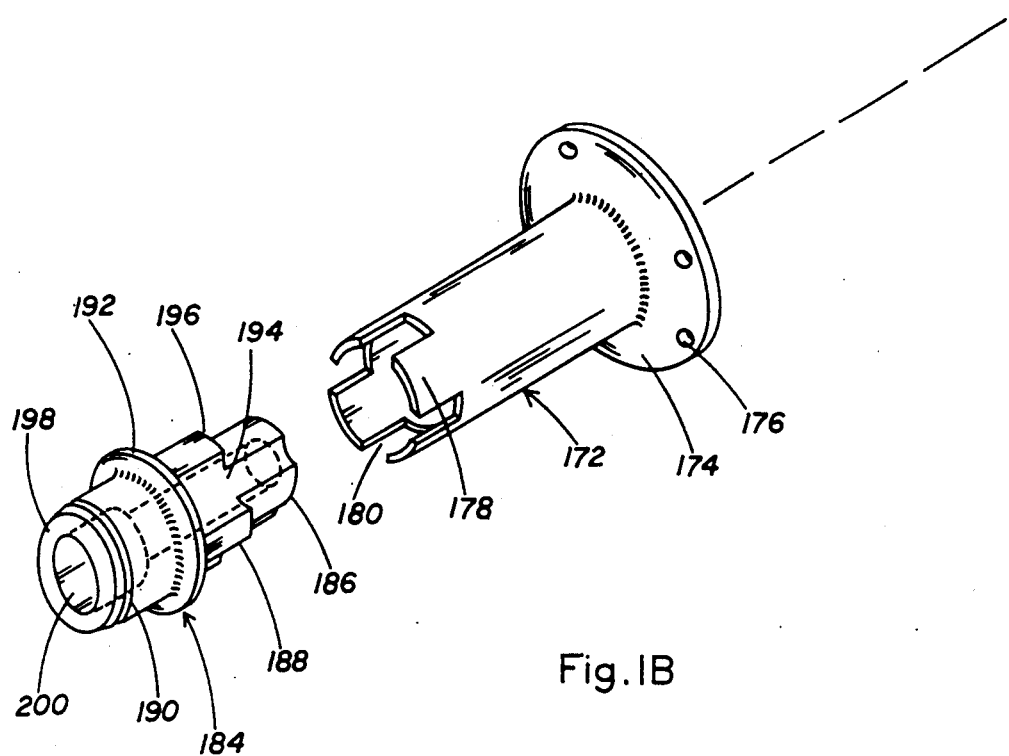

Referring now to the drawings, and particularly to FIG. 1A and 1B, the tool assembly of the present invention is shown therein and indicated generally by the numeral 10. The tool assembly 10 (see FIG. 9) includes a tool holder 12 and a clamping assembly 14.

Figure 2:
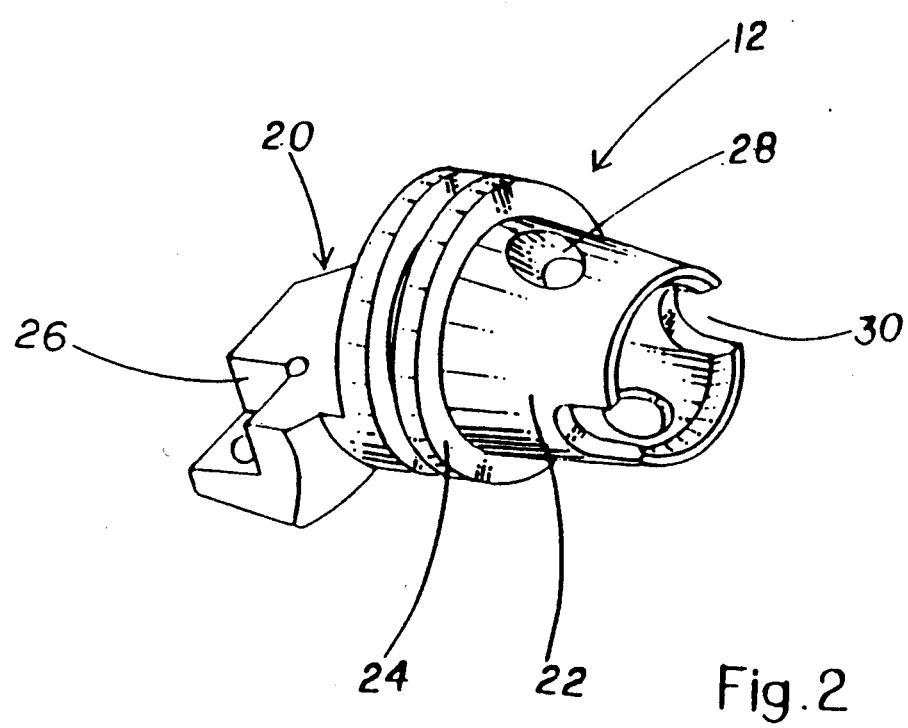
FIG. 2 is a perspective view of the tool holder.

The tool holder 12, shown in FIG. 2, is preferably of the type having a tubular shank. This type of tool holder 12 is disclosed in detail in U.S. Pat. Nos. 4,723,877 and 4,747,735 which is incorporated herein by reference.

The tool holder 12 includes a forward portion 20 and a tubular shank 22. The forward portion 20 is formed with a tool receiving pocket 26 adapted to receive a conventional shim and cutting insert (not shown). A flange 24 is formed at the rear of the forward portion 20. The shank 22 extends from the rear face of the flange 24. The shank 22 has a frustoconical shape which tapers inwardly as it extends rearwardly. At the upper end of the shank 22, where it joins the forward portion 20, the shank 22 is smaller in diameter than the flange 24 leaving a rearwardly facing shoulder which extends around the shank 22.

The tubular wall of the shank 22 is perforated at two circumferentially spaced locations by apertures 28. The apertures 28 are spaced 180° apart and extend angularly through the tubular wall of the shank 22. The tubular shank 22 also includes two diametrically opposed key slots 30 which are disposed at 90° to the apertures 28. The function of the key slots 30, as will be hereinafter described, is to accept corresponding keys on the clamping assembly 14 and thus to hold the tool holder 12 against rotation.

The clamping assembly 14 includes a support block 32 which has a generally forwardly facing surface and side faces 38 and 40. The support block 32 is adapted to be mounted on the turret head of a machine tool, with the side face 38 in contact with the turret head. For this purpose, the turret head (not shown) is provided with an opening to accept the spring assembly. The support block 32 is secured to the turret head by bolts (not shown) which extend through four bolt holes 42 as best shown in FIG. 1.

An axial bore 44 extends from the forwardly facing surface 36 of the support block 32 along the longitudinal axis y—y. A longitudinal channel 48 extends from the bottom 46 of the axial bore 44 and is coaxial with the axial bore 44. A transverse passage 50 extends through the support block along the transverse axis x—x which is in the present embodiment, perpendicular to the longitudinal axis y—y. (See FIGS. 8-11.) It should be appreciated that the transverse axis may be at an angle other than 90° with respect to the longitudinal axis y—y.

The transverse passage 50 is closed at one end by a bearing cap 52 which bolts to the side face 40. The bearing cap 52 includes a bearing wall 54 made of a hard, wear-resistant material. On the opposite end of the transverse passage 50, a recess 56 is formed adjacent the opening of the transverse 50 to provide clearance for the wedge rod which is reciprocally mounted in the transverse passage 50. The opening of the transverse passage 50 is also surrounded by a circular wall structure 58 which defines a shallow cavity 60.

A sleeve 62 is adapted to be inserted into the axial bore 44 of the support block 32. The sleeve 62 serves two functions. First, the sleeve 62 provides a receptacle into which the tool holder 12 can be inserted. Secondly, the sleeve 62 secures the ball canister 80, which is part of the clamping mechanism 14, within the axial bore 44 of the support block 32.

The outer surface 68 of the sleeve 62 is sized to fit snugly within the axial bore 44. The inner surface 66 of the sleeve 62 is tapered to correspond with the taper on the tool holder shank 22 and thus provides a receptacle for the tool holder shank 22. It should be realized, however, that the sleeve 62 is not an essential component of the present invention, since the tool holder 12 may be mounted directly in the axial bore 44 without a sleeve.

The sleeve 62 is secured to the support block 32 by bolts (not shown) which extends through bolt holes 74 in the flange 64. The bolts are threaded into corresponded openings in the support block 32 so that the flange 64 seats against the forwardly facing surface of the support block 32.

The ball canister 80, is a generally cylindrical structure having a bare flange 82. Integrally formed with the ball canister 80 are two, tiered keys 94 which are disposed at 180° with respect to one another. Each of the keys 94 includes a lower portion 96 and an upper portion 98. The ball canister 80 mounts inside the axial bore 44 and is secured by sleeve 62. When the sleeve 62 is inserted into the axial bore 44 so that the flange 64 seats against the front face of the support block, the bottom edge 70 is disposed above the bottom 46 of the axial bore thus defining an annular channel. The length of the sleeve 62 should be such that when bolts 72 are tightening the sleeve 62 exerts a downward force on the base flange 82 of the ball canister 80 to firmly secure the ball canister 80. The ball canister is held non-rotatable by engagement of the lower portions 96 of the keys 94 with corresponding keyways 76 formed in the inner surface 66 of the sleeve 62 adjacent the bottom edge 70 thereof.

A vertical passageway 84 extends through the ball canister 80 and aligns with the longitudinal axis y—y. The vertical passageway 84 includes an upper portion 86 and lower portion 88. The lower portion 88 is larger in diameter than the upper portion thereby defining a downwardly facing shoulder 90. Two diametrically opposed apertures 92 are formed in the walls of the ball canister which extend radially from the vertical passageway 84.

Figure 8:
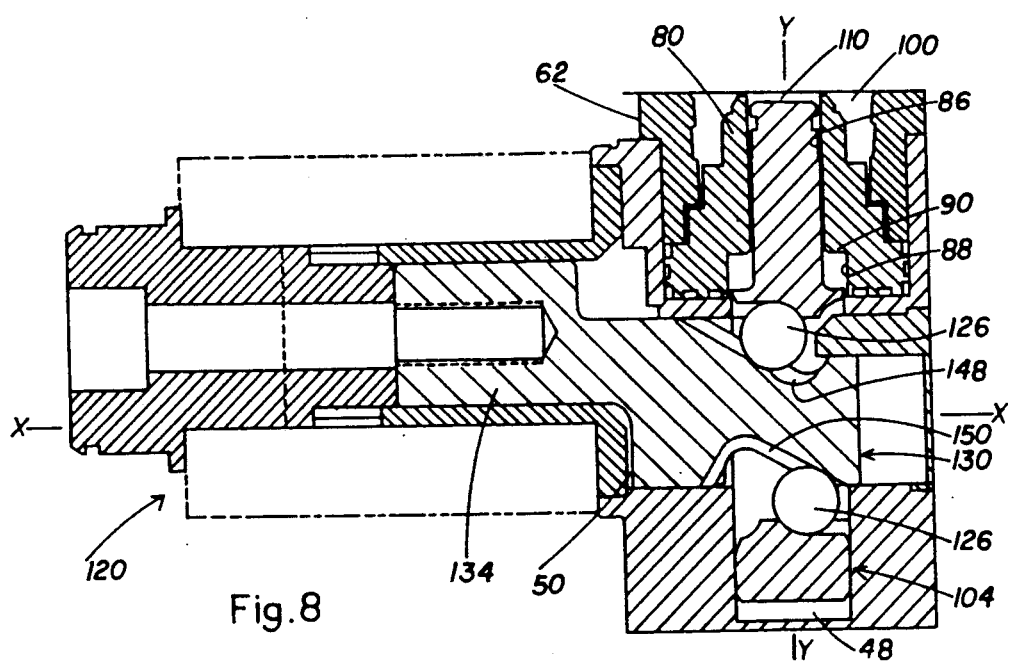
FIG. 8 is a section view of the clamping assembly, co-planar with the transverse axis x—x and longitudinal axis y—y.
Figure 10:
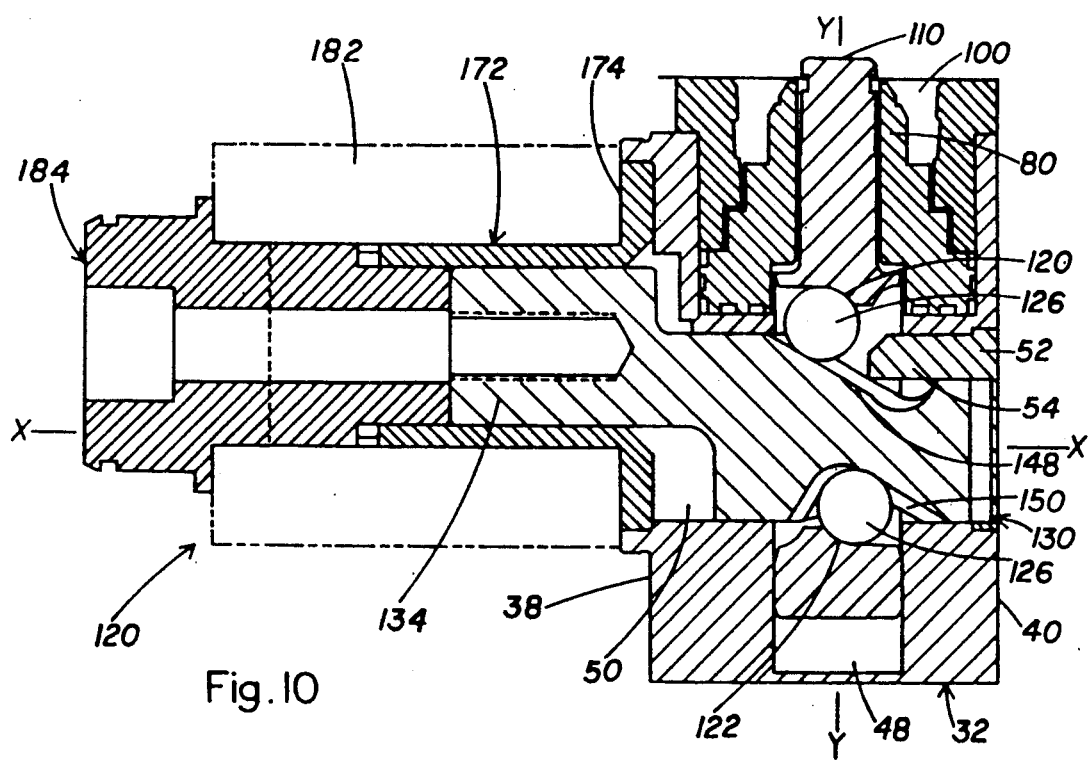
FIG. 10 is a section view of the clamping assembly co-planar with the transverse axis x—x and longitudinal axis y—y.
Figure 11:
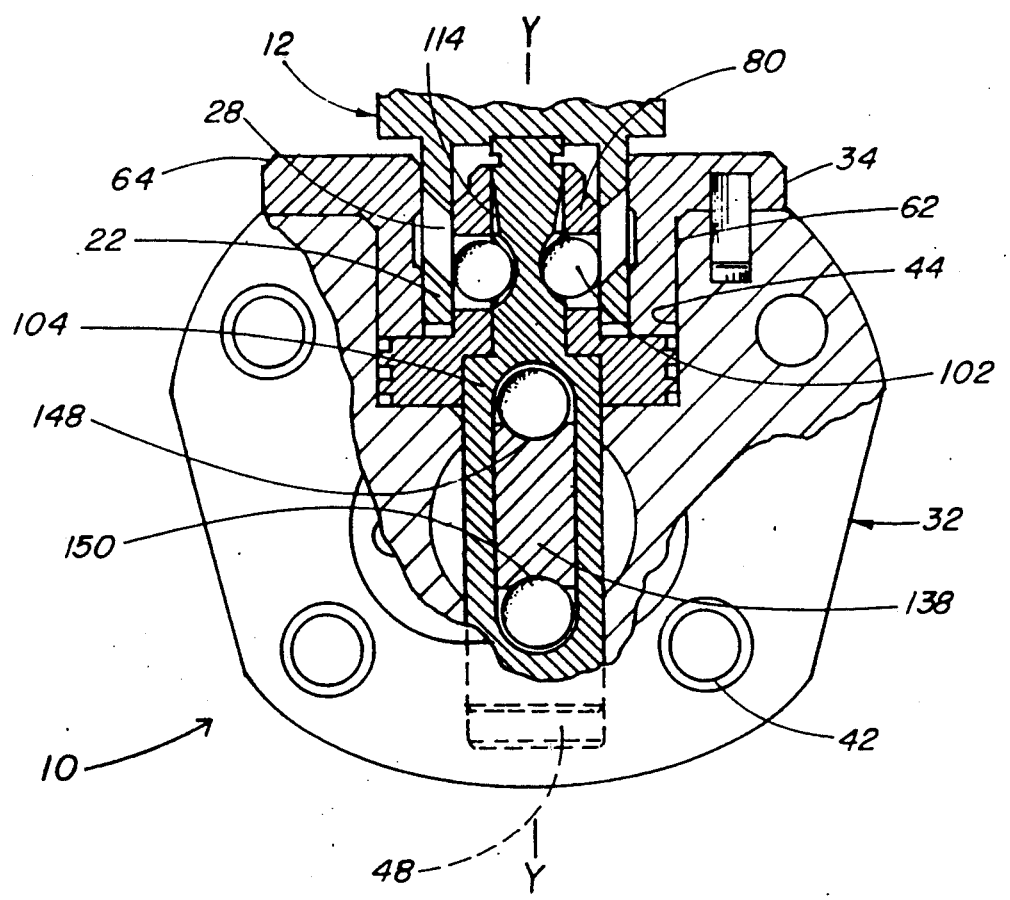
FIG. 11 is a section view of the clamping assembly taken in a plane normal to the transverse axis x—x.

As best shown in FIGS. 8 and 10, the ball canister and sleeve 62 define an annular space 100 into which the tubular shank 22 of the tool holder 12 can be inserted. When the shank 22 is inserted into the annular space 100, the upper portions 98 of the keys 94 engage in the key slots 30 in the tubular shank 22. Thus, the tool holder 12 is held non-rotatable with respect to the clamping assembly by cooperative engagement of the keys 94 with the key slots 36.

The tool holder shank 22 is secured in the annular space 100 by a pair of locking elements 102 which are loosely retained in the apertures 92 of the ball canister 80. In the embodiment shown, the locking elements comprise a pair of hardened steel balls. The locking elements 102 can be urged radially apart to engage the apertures 28 in the tool holder shank 22. The locking elements 102 are actuated by a lock rod 104 which is reciprocally mounted in the longitudinal passage 48 of the support block 32.

Referring now to FIGS. 3 and 4, the lock rod 104 used to actuate the locking elements 102 is shown. The lock rod 104 includes a front portion 106 and rear portion 108. The front portion 106 is cylindrical in shape and extends into the vertical passageway 84 in the ball canister 80. The front portion 106 has an end surface 110 which may be used for abutment against the rear face of the flange 24 when the lock rod 104 is pushed forward to unlock the tool holder 12 from the support member. In this manner, the lock rod 104 may be used to disengage and lift the tool holder 12 off the support member when the tool holder shank 22 is frictionally locked in the sleeve 62.

A pair of concave surface depressions 112 are formed in the front portion 106. The concave depressions 112 are equally spaced from the end surface 110 and are circumferentially spaced at 180° to each other. Depressions 112 are dimensioned to receive the locking elements 102 when the lock rod 104 is in a release position. The depth of the concave depressions 112 is set so that the locking elements 102 can move radially inward sufficiently to disengage from the apertures 28 in the tool holder shank 22 thereby releasing the tool holder 12.

As shown most clearly in FIG. 3, a pair of ball driving ramps 114 join respective depressions 112. Each ramp 112 declines inwardly towards the longitudinal axis y—y as it extends away from end surface 110. The surface of each ramp 114 is a concave cylindrical surface with a radius slightly larger than the radius of the locking elements 102. The angle between the ramp 114 and the longitudinal axis y—y should preferably be between 10 and 20 degrees. A greater mechanical advantage can be obtained by making this angle shallower. However, reduction of this angle will also result in an increase in the length of the ramp 114 and the stroke of the lock rod 104. An angle of 10–20 degrees provides the best compromise between these two competing concerns.

The cylindrical rear portion 108 of the lock rod 104 is received in the longitudinal passage 48. The rear portion 108 is slightly larger in diameter than the head portion 106 and forms a shoulder 116 which engages the shoulder 90 in the ball canister to limit the forward movement of the lock rod 104. The rear portion 108 is formed with a transverse passage 118. The inner walls of the central passage 118 are formed with first and second contact surfaces. In the present embodiment, the contact surfaces are concave spherical surfaces which form first and second ball seats 120 and 122. The ball seats, 120 and 122, are sized to receive a pair of ball-like force transmitting elements 126. As shown best in FIG. 3, the ball seats 120 and 122 extend from opposite sides of the lock rod 104 and terminate to form two ball stops 128.

Figure 5:
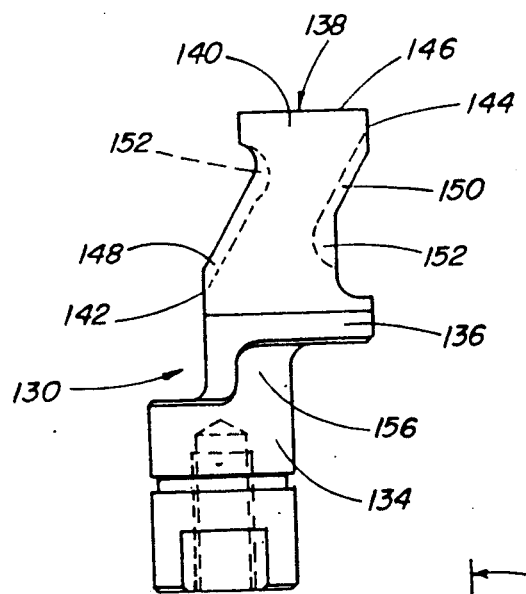
FIG. 5 is a side elevational view of the wedge rod.
Figure 6:
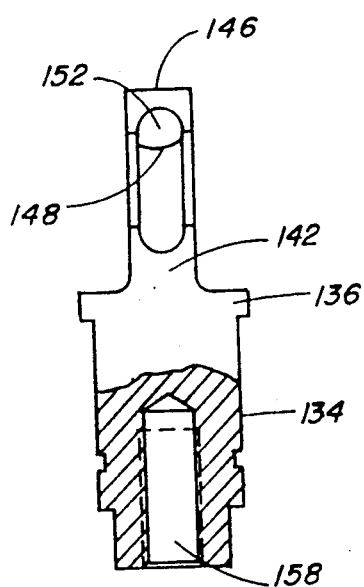
FIG. 6 is a top view of the wedge rod.

The lock rod 104 is displaced forwardly and rearwardly by a wedge rod 130 which acts in cooperation with the ball-like force transmitting elements 126. The wedge rod 130 includes a head portion 132 received in the transverse passage 50 and a shank portion 134. The head portion 132 has a generally circular flange 136 and a wedge body 138 extending forwardly from the flange 136. The wedge body 138 includes two generally flat side surfaces 140 which are joined by opposing edges 142 and 144. Two wedge surfaces are formed in the edges 142 and 144 of the wedge body 138. In the preferred embodiment, the wedge surfaces comprise two concave cylindrical ball grooves 148 and 150 with a radius slightly larger than the radius of the force transmitting elements 126. Each of the ball grooves 148 and 150 defines a pocket or ball clearance area 152. The portion of the ball grooves 148 and 150 which extends from the ball clearance areas 152 towards respective edges 142 and 144 is referred to as the ramp portion 154. As can be readily seen in FIG. 5 and 7, the ramp portion 154 of ball groove 148 inclines inwardly from the edge 142 as it extends towards the end face 146. The ramp portion 154 of ball groove 150, on the other hand, inclines inwardly towards the transverse axis x—x as the ramp moves away from end face 146. Thus, while the ramp portions of each of the ball grooves 148 and 150 incline at the same angle with respect to the transverse axis x—x they are inclined in opposite directions. Thus, the ramp portions 154 of respective ball grooves will be parallel to one another.

Figure 7A:
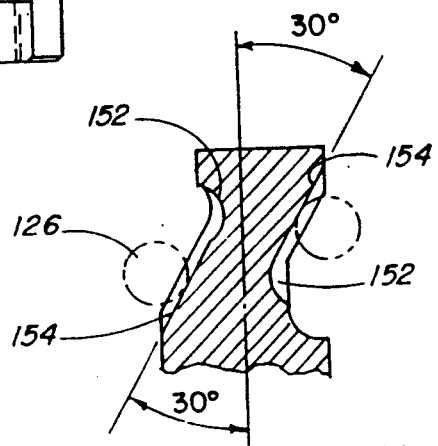
FIG. 7A is a partial section view of the wedge rod.

In the simplest embodiment, the ramps 154 have a constant angle as shown in FIG. 7a. The angle between the ramps 154 and the transverse axis x—x should be made as small as possible to maximize the mechanical advantage. This ideal configuration, however, must be balanced against the concern that the smaller angle increases the stroke of the wedge rod 130. In other words, the shallower the angle of the ramps 154, the greater distance the wedge rod 130 must be moved to accomplish the same displacement of the lock rod 104. In the embodiment, shown in FIG. 7a, the angle of incline of the ramps 154 with respect to the transverse axis x—x is approximately 30°.

With the present invention, it is also possible to vary the angle of the ramps 154. As shown in FIG. 7b, the portion of the wedge ramps 154 immediately adjacent the ball clearance area 152, which is referred to as the idle portion 154a, can have a steeper angle than the working portion 154b. The relatively steep angle of the idle portion 154a reduces the stroke of the wedge rod 130. The working portion 154b, however, has a shallower angle than the idle portion 154a. Thus, the working portion 154b will provide a greater mechanical advantage.

Figure 7C:
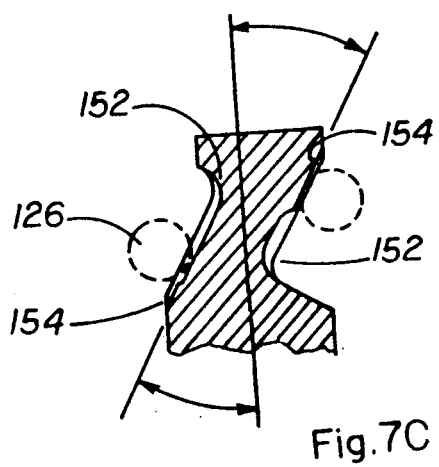
FIG. 7C is a partial section view of a third version of the wedge rod.
Figure 7B:
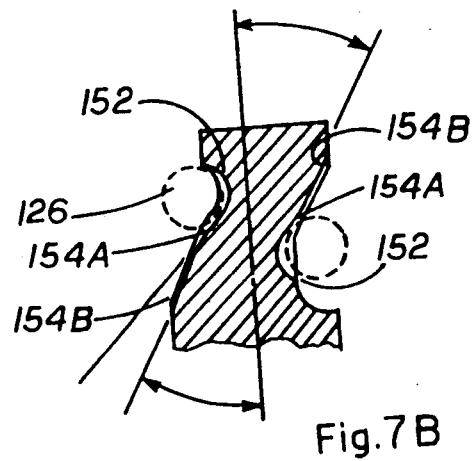
FIG. 7B is a partial section view of a second version of the wedge rod.

Another variation on the design of the wedge rod is shown in FIG. 7c. In this embodiment, there is an abrupt level change between the ball clearance area 152 and the ramp 154. The abrupt level change shortens the stroke of the wedge rod 130. As long as the force transmitting element 126 is within the clearance area 152, it cannot contact both the ball groove and the contact surface of the lock rod. Thus, the lock rod 104 is not moved. However, when the force transmitting element 126 bumps onto the ramp 154 it will be in contact with both surfaces. Any movement of the wedge rod 130 after this point will result in a corresponding movement of the lock rod 104.

The head portion 132 of the wedge rod 130 is connected to the shank portion 134 by a neck 156. The shank 134 is generally cylindrical and has a center line which is parallel to the transverse axis x—x. A threaded opening 158 extends from the end of the shank portion 132, along the centerline.

The head portion 132 of the wedge rod is received in the transverse passage 50 of the support block 32 and extends through the central passage 118 in the lock rod 104. The force transmitting elements 126 are captured between the wedging surfaces of the wedge rod 130 and the contact surfaces of the lock rod 104 as shown in FIGS. 8-11. When the wedge rod is moved in a first direction (to the left as shown in FIGS. 8 and 10) a first force transmitting element is urged outwardly with respect to the transverse axis x—x by ball groove 150. At the same time, the second force transmitting element 126 is moving inwardly towards the ball clearance area 152 along ball groove 148. The first force transmitting element pushes against the rear ball seat 122 to displace the lock rod 104 rearwardly.

When the wedge rod is moved in a second direction (to the right as shown in FIGS. 8 and 10), the second force transmitting element 126 is moved outward with respect to transverse axis x—x by ball groove 148. The first force transmitting element, at the same time, moves inward along ball groove 150 toward the ball clearance are a 152. In this direction, the second force transmitting element pushes against the forward ball seat 120 to displace the lock rod forwardly. Thus, the wedge rod 130 effects positive displacement of the lock rod 104 in two directions.

The lock rod 104 and wedge rod is 130 are biased in the first direction, which is the locked position, by a spring assembly. The spring assembly includes a spring guide 172, bevel spring 182 and spring cap 184. The spring guide 172 is adapted to be mounted to the support block 32. For this purpose, the spring guide 172 is provided with a base flange 174 which is approximately the same diameter as the circular wall structure 58. The base flange 174 is provided with four bolt holes (not shown) through which bolts 177 extend to secure the spring guide 172 to the support block 32. The opposite end 178 of the spring guide is provided with four circumferentially spaced notches 180. The notches 180 are adapted to mate with corresponding projections 196 on the spring cap 184 to hold the spring guide 172 and spring cap 184 non-rotatable with respect to one another.

The bevel spring 182 is disposed around the spring guide 172 and is retained there by the spring cap 184. The spring cap 184 includes an inner portion 186, a central portion 188, and an outer portion 190. Four flutes 194 extend along the length of the inner portion 186 and central portion 188 to define four equally spaced projections 196. The inner portion 186 is sized to fit inside the spring guide 172. The central portion 188 is roughly equal in diameter to the outer circumference of the spring guide 172 so that the projections 196 engage in the notches 180 of the spring guide 172.

The outer portion 190 includes an angular flange 192 which is engaged by one end of the bevel spring 182. The opposite end of the bevel spring 182 engages with the base flange 174 of the spring guide 172. A bolt (not shown) extends through a hole 200 in the spring cap 184 and threads into a threaded opening 158 in the end of the wedge rod 130. The bolt is tightened sufficiently to compress the bevelled spring 182 until the desired spring force is obtained. In most applications, a spring force of approximately 2000 lbs. will be sufficient.

Figure 9:
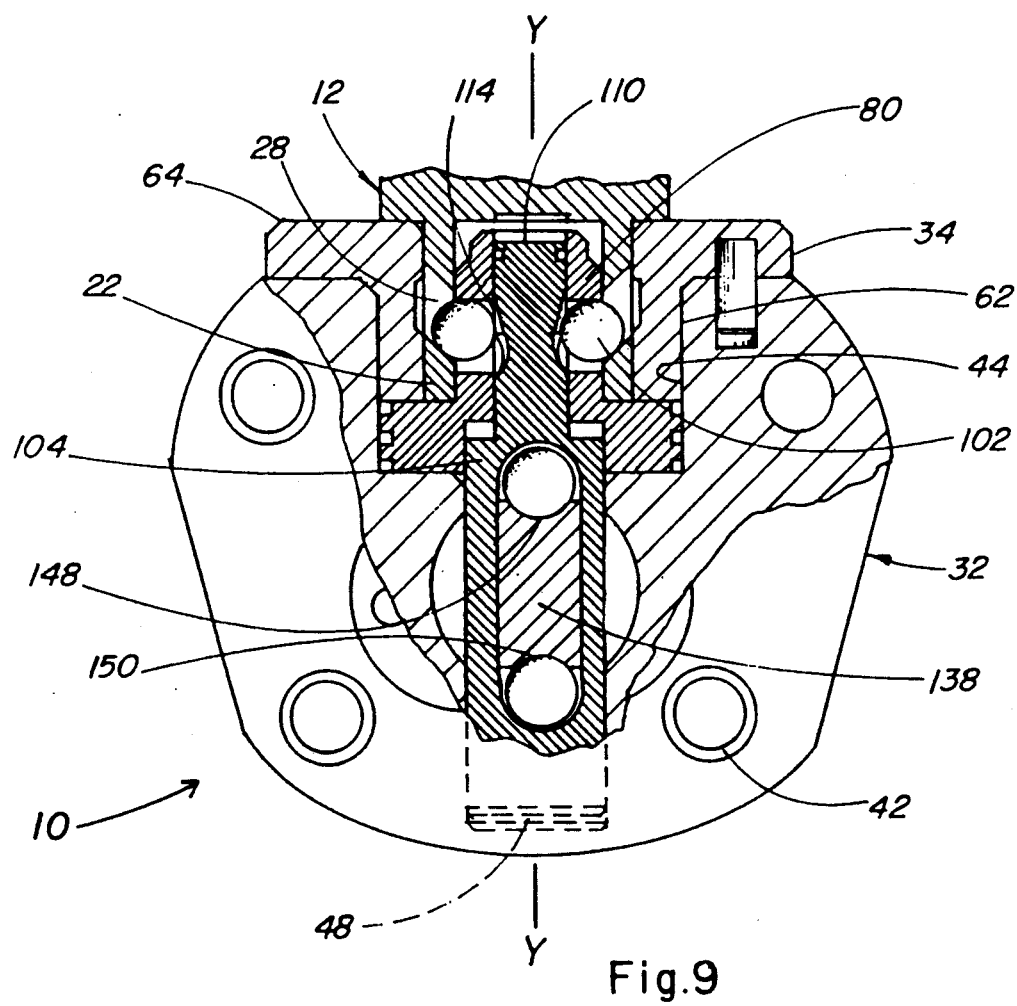
FIG. 9 is a section view of the clamping assembly, taken in a plane normal to the transverse axis x—x.

The spring 182 biases the wedge rod 130 and lock 104 rod so that they normally takes the locked position shown in FIGS. 8 and 9. In the locked position, the ball driving ramps 114 of the lock rod 104 urge the locking elements 102 radially outwardly into engagement with the apertures 28 in the shank 22 of the tool holder 12. The engagement of the locking elements 102 with the apertures 28 of the tool holder shank 22 urges the tool holder 12 rearwardly so that the abutment surface 24 seats against the front face of the sleeve 62.

To release the tool holder 12, a force sufficient to overcome the bevelled spring 182 is applied to the butt end 198 of the spring cap 184. As the wedge rod 130 moves in the second direction towards a release position, the first ball groove 148, in cooperation with one of the force transmitting elements 126, displaces the lock rod 104 forwardly. As the lock rod moves forwardly, the end surface 110 engages the tool holder 12 to disengage the tool holder 12 from the clamping assembly 14. The locking balls 102 move radially inwardly into the concave depressions 112 of the lock rod 104 to release the tool holder shank 22.

By interposing the ball-like force transmitting elements between the wedge rod 130 and lock rod 104, the action between those components is smoother and more efficient. Frictional losses are greatly reduced which results in an increase in the ratio of output force to input force. Thus, the torque or spring force needed to clamp the tool holder is also reduced. Also, wear on the contact surfaces is reduced resulting in longer life of the mechanism.

The present invention may, of course, be carried out in other specific ways than those herein set forth without departing from the spirit and essential characteristics of the invention. For instance, the force transmitting elements may be short dowel pins instead of balls, and the contact surfaces of the wedge rod and lock rod may be flat instead of concave. The present embodiments are, therefore, to be considered in all respects as illustrative and not restrictive and all changes coming within the meaning and equivalency range of the appended claims are intended to be embrace therein.

What is claimed is:

1. A clamping assembly for releasably holding a tool holder having a shank, comprising:
   (a) a tool support member having a bore extending along a longitudinal axis for receiving the shank of the tool holder;
   (b) a locking mechanism disposed in the bore for securing the tool holder to the support member, the locking mechanism including at least one moveable locking element for releasably engaging the shank of the tool holder;
   (c) actuating means for urging the locking element radially outwardly to engage the shank of the tool holder, the actuating means including a lock rod having first and second contact surfaces and mounted in the support member for reciprocal movement along the longitudinal axis between a locked position and a release position;

(d) a wedge rod mounted in the support member for reciprocal movement along a transverse axis, said wedge rod having first and second wedge surfaces which incline towards the transverse axis; and (e) first and second force transmitting elements each of which is engaged with a respective wedge surface of the wedge rod and a contact surface of the lock rod, wherein when the wedge rod is moved in a first direction, the first force transmitting element is moved outward with respect to the transverse axis into contact with the first contact surface of the lock rod and moves the lock rod towards a locked position, and when the wedge rod is moved in a second direction, the second force transmitting element is moved outward with respect to the transverse axis into engagement with the second contact surface of the lock rod and moves the lock rod towards a release position.

2. The clamping assembly according to claim 1 further including means for biasing the wedge rod in the first direction so that the lock rod is normally disposed in the locked position.

3. The clamping assembly according to claim 2 wherein the biasing means includes a spring assembly for urging the wedge rod in the first direction.

4. The clamping assembly according to claim 3 wherein the spring assembly includes a spring guide mounted to the tool support member, a spring disposed around the spring guide, and a spring cap having one end secured to the wedge rod for retaining the spring on the spring guide.

5. The clamping assembly according to claim 1 further including means for pushing the tool holder forwardly to disengage the tool holder shank from the tool support member.

6. The clamping assembly according to claim 5 wherein the pushing means includes a striking surface formed on one end of the lock rod adapted to engage the tool holder when the lock rod is moved to the release position.

7. The clamping assembly according to claim 1 wherein the lock rod includes a central passage through which the wedge rod extends, and wherein the first and second contact surfaces are formed in the inner wall of the central passage.

8. The clamping assembly according to claim 1 wherein the force transmitting elements are balls.

9. The clamping assembly according to claim 8 wherein the wedge surfaces each comprise a ball groove formed in the wedge rod, and wherein the force transmitting elements are engaged in respective ball grooves.

10. The clamping assembly according to claim 8 wherein the contact surfaces of the lock rod are concave depressions which form a ball seat and wherein the force transmitting elements are engaged in the concave depressions.

11. The clamping assembly according to claim 1 wherein the angle of incline of the wedge surface varies along the length of the wedge surface.

12. The clamping assembly according to claim 1 wherein the wedge rod includes first and second ball clearance areas adjacent respective wedge surfaces, there being an abrupt level change between the wedge surfaces and ball clearance areas, wherein the spacing between the surface of the ball clearance and the contact surface of the lock rod is such that the force transmitting element cannot simultaneously engage both.

13. A clamping assembly for releasably holding a tool holder having a tubular shank, comprising:

(a) a tool support member having a bore extending along a longitudinal axis for receiving the shank of the tool holder, a longitudinal passage extending from the bottom of the bore along the longitudinal axis, and a transverse passage extending along a transverse axis;

(b) a ball canister disposed within the bore and receivable in the tubular shank of the tool holder;

(c) the ball canister including a vertical passageway extending therethrough along the longitudinal axis, and at least one aperture extending radially outwardly from the vertical passageway;

(d) a sleeve insertable into the axial bore of the support member for retaining the ball canister within the bore wherein the sleeve and the ball canister defines an annular space for receiving the tubular shank of the tool holder;

(e) at least one locking element for releasably engaging the tubular shank of the tool holder to lock the tool holder to the support member, the locking element being loosely retained in the aperture in the ball canister;

(f) means for actuating the locking element to urge it radially outward into engagement with the shank of the tool holder, the actuating means including a lock rod mounted in the support member for reciprocal movement along the longitudinal axis between a locked position and a released position;

(g) the lock rod having a forward portion extending into the vertical passage way in the ball canister, the forward portion including a camming surface adapted to urge the locking element radially outwardly into engagement with the shank of the tool holder when the lock rod is moved rearwardly in the longitudinal passage, the forward portion further including a concave depression adjacent the camming surface to permit the locking element to move radially inwardly when the lock rod is moved forwardly in the longitudinal passage;

(h) the lock rod further including a rear portion formed with a central passageway having first and second contact surfaces;

(i) a wedge rod mounted in the transverse passage of the support block for reciprocal movement along the transverse axis, the wedge rod including first and second wedge surfaces which incline in parallel fashion from opposing edges, wherein the wedge rod extends through the central passage in the lock rod; and (j) first and second force transmitting elements each of which is engaged with a respective wedge surface of the wedge rod and a contact surface of the lock rod, wherein when the wedge rod is moved in a first direction along the transverse axis, the first wedge surface urges the first force transmitting element outward with respect to the transverse axis into engagement with the first contact surface so as to move the lock rod towards the locked position, and wherein when the wedge rod is moved in a second direction along the transverse axis the second wedge surface urges the second force transmitting element outwardly with respect to the transverse axis and into engagement with the second contact surface of the lock rod so as to move the lock rod towards the release position.

14. The clamping assembly according to claim 13 further including means for biasing the wedge rod in the first direction so that the lock rod is normally disposed in the locked position 15. The clamping assembly according to claim 14 wherein said biasing means includes a spring assembly for urging the lock rod in the first direction.

16. The clamping assembly according to claim 15 wherein the spring assembly includes a spring guide mounted to the tool support member, a spring disposed around the spring guide, and a spring cap having one end secured to the wedge rod for retaining the spring on the spring guide.

17. The clamping assembly according to claim 13 further including means for pushing the tool holder forwardly to disengage the tool holder shank from the tool support member.

18. The clamping assembly according to claim 17 wherein the pushing means includes a striking surface formed on one end of the lock rod adapted to engage the tool holder when the lock rod is moved to the released position.

19. The clamping assembly according to claim 13 wherein the force transmitting elements are balls.

20. The clamping assembly according to claim 19 wherein the wedge surfaces each comprise a ball groove formed in respective edges of the wedge body, the force transmitting elements being engaged in respective ball grooves.

21. The clamping assembly according to claim 19 wherein the contact surfaces of the lock rod are concave depressions, and wherein the force transmitting elements are engaged in the concave depressions.

22. The clamping assembly according to claim 13 wherein the angle of incline of the wedge surface varies along the length of the wedge surface.

23. The clamping assembly according to claim 13 wherein the wedge rod includes first and second ball clearance areas adjacent respective wedge surfaces, there being an abrupt level change between the wedge surfaces and ball clearance areas, wherein the spacing between the surface of the ball clearance and the contact surface of the lock rod is such that the force transmitting element cannot simultaneously engage both.

24. A clamping assembly for releasably holding a tool holder having a shank, the clamping assembly comprising:
(a) a tool support member having a bore extending along a longitudinal axis for receiving the shank of the tool holder;
(b) locking means disposed within the bore for releasably engaging the tool holder shank to secure the tool holder to the support member; and
(c) means for actuating the locking means including:
  (1) a first member for urging the locking means into engagement with the tool holder shank, the first member being mounted within the support member for reciprocal movement along a longitudinal axis between a locked position and a released position;
  (2) the second member being mounted in the support member for reciprocal movement along an axis at an angle to the longitudinal axis for displacing the first member along the longitudinal axis;
  (3) wherein one of the first and second members is formed with a central passage having two contact surfaces;
  (4) the other of the two members having two wedge surfaces which incline in parallel fashion; and
  (5) at least two force transmitting elements engaged with respective wedge surfaces, the force transmitting elements also being engaged with the respective contact surfaces wherein when the second member is moved in a first direction the first member is moved towards the locked position by cooperative engagement between the first wedge surface, first force transmission element, and first contact surface, and wherein when the second member is moved in a second direction the first member is moved towards the release position by cooperative engagement of the second wedge surface, the second force transmitting element, and the second contact surface.

25. The clamping assembly according to claim 24 wherein the second member is biased in the first direction.

26. The clamping assembly according to claim 24 including means for pushing the tool holder forwardly to disengage the tool holder from the tool support.

27. The clamping assembly according to claim 26 wherein the pushing means includes a striking surface formed on one end of the first member adapted to engage the tool holder when the first member is moved to the release position.

28. A clamping assembly according to claim 24 wherein the force transmitting elements are balls.

29. The clamping assembly according to claim 28 wherein the wedge surfaces comprise ball grooves.

30. The clamping assembly according to claim 28 wherein the contact surfaces comprise concave depressions.

31. A clamping assembly for releasably holding a tool holder comprising:
(a) a tool support member having a bore extending along a longitudinal axis for receiving the tool holder;
(b) locking means disposed in the bore for securing the tool holder to the support member, the locking means including a lock rod having first and second contact surfaces and mounted in the support member for reciprocal movement along the longitudinal axis between a locked position and a release position;
(c) a wedge rod mounted in the support member for reciprocal movement along a transverse axis, said wedge rod having first and second wedge surfaces which incline towards the transverse axis; and
(d) first and second force transmitting elements each of which is engaged with a respective wedge surface of the wedge rod and a contact surface of the lock rod, wherein when the wedge rod is moved in a first direction, the first force transmitting element is moved outward with respect to the transverse axis into contact with the first contact surface of the lock rod and moves the lock rod towards the locked position, and when the wedge rod is moved in a second direction, the second force transmitting element is moved outward with respect to the transverse axis into engagement with the second contact surface of the lock rod and moves the lock rod towards the release position.

32. The clamping assembly according to claim 31 further including means for biasing the wedge rod in the first direction so that the lock rod is normally disposed in the locked position.

33. The clamping assembly according to claim 32 wherein the biasing means includes a spring assembly for urging the wedge rod in the first direction.

34. The clamping assembly according to claim 33 wherein the spring assembly includes a spring guide mounted to the tool support member, a spring disposed around the spring guide, and a spring cap having one end secured to the wedge rod for retaining the spring on the spring guide.

35. The clamping assembly according to claim 31 further including means for pushing the tool holder forwardly to disengage the tool holder shank from the tool support member.

36. The clamping assembly according to claim 35 wherein the pushing means includes a striking surface formed on one end of the lock rod adapted to engage the tool holder when the lock rod is moved to the release position.

37. The clamping assembly according to claim 31 wherein the lock rod includes a central passage through which the wedge rod extends, and wherein the first and second contact surfaces are formed in the inner wall of the central passage.

38. The clamping assembly according to claim 31 wherein the force transmitting elements are balls.

39. The clamping assembly according to claim 38 wherein the wedge surfaces each comprise a ball groove formed in the wedge rod, and wherein the force transmitting elements are engaged in respective ball grooves.

40. The clamping assembly according to claim 38 wherein the contact surfaces of the lock rod are concave depressions which form a ball seat and wherein the force transmitting elements are engaged in the concave depressions.

41. The clamping assembly according to claim 31 wherein the angle of incline of the wedge surface varies along the length of the wedge surface.

42. The clamping assembly according to claim 31 wherein the wedge rod includes first and second ball clearance areas adjacent respective wedge surfaces, there being an abrupt level change between the wedge surfaces and ball clearance areas, wherein the spacing between the surface of the ball clearance and the contact surface of the lock rod is such that the force transmitting element cannot simultaneously engage both.

* * * * *